UNITED STATES PATENT OFFICE 2,625,491

STABILIZED WAX COMPOSITION

David W. Young, Roselle, and Paul V. Smith, Jr., Westfield, N. J., assignors to Standard Oil Development Company, a corporation of Delaware No Drawing. Application December 29, 1949, Serial No. 135,846

8 Claims. (Cl. 106—270)

The invention relates to long chain wax-like compositions and particularly to such compositions which remain stable to light over extended periods of time.

The wax compositions to be stabilized by the present invention are characterized by the presence of a long chain consisting of the group, $-CH_2$  $CH_2-$. For example, paraffin wax has the following formula:

$$CH_3-(CH_2)_x-CH_3$$

where $x$ is any integer.

Similarly, polyethylene has the formula

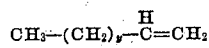

$$CH_3-(CH_2)_y-\overset{H}{C}=CH_2$$

where $y$ is any odd number. The presence of the $(-CH_2-)_y$ in the chain confers many of the properties of paraffin wax upon polyethylene and for this reason this material may be treated as a synthetic wax. The double bond at the end of the chain has relatively little effect on the properties of the molecule as a whole. Accordingly, any predominantly straight chain compound having a long chain consisting of a plurality of $-CH_2-$ groups in a long chain will behave similarly to paraffin wax and is to be included within the scope of the present invention. Hereinafter long chain compounds having the above structure will be termed waxes.

Heat and light stability are important properties to consumers of wax depending on the use to be made of the wax. Many large wax consumers purchase wax in tank car lots. This wax must have reasonable stability so that it will not change color or odor appreciably during transportation, reheating at destination, intermediate tank storage and application on waxing machines at 160–200° F. Discolored and odoriferous waxes due to instability to heat and light during these periods prior to final use are often refused by the trade. Consequently specifications requiring both heat and light stable waxes are being set up by many large consumers.

While the effect of heat on the stability of waxes has been known for some time, it is only recently that the realization has been acquired that light is also a factor.

It is well known that certain 2,4,6-trialkylated phenols, such as 2,6-di-tertiary-butyl-4-methylphenol, are excellent heat stabilizers for waxes. However, most of them are of little, if any, importance as stabilizers for light.

It has now been found that the mono-, di-, and/or tri-ricinoleate esters of polyethylene glycol having the formula, $HO(CH_2CH_2O)_nH$, where $n$ is an integer from 2 to 10, are outstanding agents for use in stabilizing waxes against deterioration by light. Since these materials are not good stabilizers against heat, it is necessary to incorporate a heat stabilizer in the wax along with the polyethylene glycol ricinoleate. Accordingly, the invention also proposes that a heat and light stable wax be prepared by the addition to wax of a 2,4,6-trialkylated phenol, such as 2,6-di-t-butyl-4-methylphenol as the heat stabilizer and the polyethylene glycol ricinoleate as the light stabilizer.

These stabilizing materials may be incorporated with the wax in any desired amount, depending upon the conditions under which the material is to be used. If the conditions are harsh or severe, it is desirable to add a relatively large amount, while if the conditions are relatively mild, a very minute quantity will be sufficient. The stabilizing material may be contained in the wax in a concentration of from 0.001% to 2% or higher. It is, however, preferred to add the material in concentrations from 0.01% to 1%.

The following examples illustrate the advantages of the present invention:

In these examples, the terminology "polyethylene glycol di, tri-ricinoleate" is employed to identify a particular ester and not to indicate a mixture of esters. The ester identified is esterified at each of the hydroxyl groups of the polyethylene glycol and the final ester contains three ricinoleic acid radicals at each of these positions on the polyethylene glycol molecule.

EXAMPLE 1

Various types of organic compounds were added in different proportions to refined hydrocarbon wax and the products tested for color and odor before and after exposure to heat and light. The following results were obtained:

Table 1

| | Inhibitor conc., weight percent | Fresh stock | | Heat stability [1] | | Light stability [2] | |
|---|---|---|---|---|---|---|---|
| | | Color [3] | Odor [4] | Color [3] | Odor [4] | Color [3] | Odor [4] |
| Wax | | +30 S | 1.0 | −13 S | 3.0 | −3 S | 3.0 |
| Plus: | | | | | | | |
| Dimethyl silicon polymer | 0.01 | do | 1.0 | +4 S | 1.0 | −5 S | 3.0 |
| Octadecyl amine | .01 | do | 2.0 | +13 S | 3.0 | −9 S | 3.0 |
| Do | .10 | do | 2.0 | +5 S | 3.0 | −5 S | 3.0 |
| 2,6-ditertiary-butyl-4-methylphenol | .01 | +29 S | 1.0 | +22 S | 1.5 | +10 S | 3.0 |
| Do | .05 | +28 S | 1.0 | +24 S | 1.5 | +9 S | 3.0 |
| Phenoxy propylene oxide | .05 | +30 S | 3.0 | +18 S | 3.0 | +18 S | 2.6 |
| Organic Phosphite [5] | .2 | | | | | +4 S | |
| Do | 1.0 | | | | | −1 S | |
| Mono tert-butyl ether of hydroquinone | .2 | +30 S | 3.0 | | | Brown | |
| Do | 1.0 | +28 S | 3.0 | | | do | |
| Polyethylene glycol di,tri-ricinoleate [6] | .1 | +24 S | 1.7 | 10½ TR | 3.0 | +22 S | 2.7 |
| Do | .5 | +17 S | 1.2 | do | 3.0 | do | 2.7 |
| Do | 1.0 | +14 S | 1.4 | 13 TR | 3.0 | +24 S | 3.0 |
| Tenox BHA (butylated hydroxy anisole) | .1 | +29 S | 3.0 | 18¼ TR | 2.8 | −2 S | 3.0 |
| 2,6-di-tert-butyl-4-methoxyphenol | .1 | +25 S | 2.6 | 18½ TR | 3.0 | +3 S | 3.0 |

[1] 16 hours at 302° F. in presence of copper; 0 Saybolt color or lighter and satisfactory odor is passing.
[2] 23 hours under carbon arc in Weather-O-Meter; 0 Saybolt color or lighter and satisfactory odor is passing.
[3] S—Saybolt; TR—Tag Robinson.
[4] Rating: 1, no or slight odor; 2, odor but not objectionable; 3, objectionable odor.
[5] Reaction product of 2,6-di-tert-butyl-4-tert-octylphenyl ether of ethylene glycol with phosphorus trichloride.
[6] Prepared from a polyethylene glycol having a molecular weight of 400.

The above data indicate that polyethylene glycol di-, tri-ricinoleate is an excellent stabilizer for wax against deterioration by light. At the same time the data show that such an excellent heat stabilizer as 2,6-di-t-butyl-4-methylphenol is a poor light stabilizer.

*Example 2*

In a second experiment, a paraffin wax with a melting point of 132° F., and an oil content of 0.2%, was melted at 160° F. and poured into a stainless steel mold. The mold was of such a size that slabs of wax were made that had the following dimensions:

6″ x 4″ x ½″

After the wax had cooled in a clean laboratory, it was removed from the mold. One half of each slab was well-wrapped in tin foil. The slab of wax was then placed in a window facing south. After a period of 14 days at room temperature the wax was evaluated for color and odor and the following results were obtained:

Table 2

| Sample | Exposed to Light | | Unexposed to Light | |
|---|---|---|---|---|
| | Color | Odor | Color | Odor |
| 1. Paraffin wax | Light yellow | Poor | White | Good. |
| 2. Paraffin wax + 0.4% polyethylene glycol di-, tri-ricinoleate [1] | White | Good | do | Do. |
| 3. Paraffin wax + 0.6% polyethylene glycol di-, tri-ricinoleate [1] | do | do | do | Do. |

[1] Prepared from a polyethylene glycol having a molecular weight of 400.

The above results indicate the superior value of the use of the ester of this invention in wax when the wax is tested by a normal storage procedure.

*EXAMPLE 3*

In order to show that polyethylene glycol di-, tri-ricinoleate is not an antioxidant, 0.5% of 2,6-di-t-butyl-4-methylphenol and polyethylene glycol di-, tri-ricinoleate were each added to a blend of paraffin wax and polyisobutylene. Each mixture was heated to 153° C. until the viscosity of the blend was reduced 50%. The time in hours for the blend to reach 50% of its original viscosity is reported in the following data:

Table 3

Compound: Time in hours to reach 50% breakdown in viscosity
- Original blend (blank) _____ 7
- 2,6-di-t-butyl-4-methylphenol _____ 325
- Polyethylene glycol di-, tri-ricinoleate[1] __ 6

[1] Prepared from a polyethylene glycol having a molecular weight of 400.

The above data clearly show that polyethylene glycol di-, tri-ricinoleate is not an antioxidant, the blend in which the material was incorporated was reduced in viscosity to half its original value in six hours compared with seven hours for the blend without any addition agent.

*EXAMPLE 4*

In an experiment similar to Example 3, 2,6-di-t-butyl-4-methylphenol and polyethylene glycol di-, tri-ricinoleate were added separately and together to a refined wax and the following data were obtained:

Table 4

| | Fresh wax | | Heat stability [1] | | Light stability [2] | |
|---|---|---|---|---|---|---|
| | Color [3] | Odor [4] | Color [3] | Odor [4] | Color [3] | Odor [4] |
| Refined wax | +30 S | 1.2 | 12 TR | 3.0 | +13 S | 3.0 |
| + 0.01% 2,6-di-t-butyl-4-methylphenol | +30 S | 1.2 | +26 S | 1.2 | +13 S | 3.0 |
| + 0.1% polyethylene glycol di,tri-ricinoleate [5] | +24 S | 1.7 | 11 TR | 3.0 | +22 S | 2.7 |
| +0.01% 2,6-di-t-butyl-4-methylphenol + 0.05% polyethylene glycol di-tri-ricinoleate [5] | +20 S | 2.0 | +17 S | 3.0 | +18 S | 3.0 |

[1] 16 hours at 302° F. in presence of copper.
[2] 23 hours' exposure to carbon arc of Fade-O-Meter.
[3] S—Saybolt; TR—Tag Robinson.
[4] Rating: 1, no or slight odor; 2, odor but not objectionable; 3, objectionable odor.
[5] Prepared from a polyethylene glycol having a molecular weight of 400.

The above data show that it is necessary to add both of these materials to the wax in order to obtain both heat and light stability.

EXAMPLE 5

0.6% diethylene glycol mono-ricinoleate, polyethylene glycol mono-ricinoleate, and polyethylene glycol, di-, tri-ricinoleate were tested in 7,000 and 12,000 molecular weight polyethylene by a 2½ month exposure to direct sunlight. Slabs 6″ x 6″ x ½″ were molded and half of it wrapped in tin foil prior to the sunlight exposure. At the end of the test, the exposed half of the control slab was light yellow while that under the tin foil remained white. In the case of the slab containing the esters, there were no differences between the color of the exposed and protected halves of the slab—both were white.

EXAMPLE 6

Enamel plates were polished with two automobile waxes prepared from carnauba wax, 148 melting point paraffin wax, kerosene, and dye. One wax contained 0.01% by weight of 2,6-di-t-butyl-4-methylphenol and 0.1% by weight of polyethylene glycol di-, tri-ricinoleate and the other wax contained no stabilizer. The polished panels were allowed to age 11 weeks under outdoor exposure conditions. The panel polished with the wax containing the stabilizer was only slightly oxidized and still possessed good luster. The panel polished with the wax containing no stabilizer was found to be much duller than the other.

The above examples clearly show the effectiveness of the light stabilizing agents in long-chain wax-like hydrocarbon products such as polyethylene and paraffin wax and in car polishes containing wax. It is not completely satisfactory in blends of vinyl compounds with a copolymer of acrylonitrile and butadiene known as Paracril. It is completely ineffective in stabilizing spindle oils. The polyethylene glycol ricinoleates are unique in possessing the above properties since substances similar in structure, such as castor oil, pentaerythritol monostearate and ethylene glycol monostearate have been found to be ineffective as light stabilizers in these wax-like compositions.

The nature and objects of the present invention having been thus fully set forth and specific examples of the same given, what is claimed as new and useful and desired to be secured by Letters Patent is:

1. An improved normally solid wax-like composition consisting essentially of a substantially colorless wax-like hydrocarbon product chosen from the class consisting of paraffin wax and polyethylene and as a light stabilizing agent 0.01–1% of a ricinoleate ester of polyethylene glycol having the formula $$HO(CH_2CH_2O)_nH$$

where $n$ is an integer from 2 to 10.

2. Composition according to claim 1 in which the wax-like hydrocarbon product is paraffin wax.

3. Composition according to claim 1 in which the wax-like hydrocarbon product is polyethylene.

4. Composition according to claim 3 in which the light stabilizing agent is diethylene glycol mono-ricinoleate.

5. Composition according to claim 3 in which the light stabilizing agent is polyethylene glycol mono-ricinoleate.

6. Composition according to claim 3 in which the light stabilizing agent is polyethylene glycol di, tri-ricinoleate.

7. An improved normal solid petroleum wax composition consisting essentially of a substantially colorless petroleum wax and as a light stabilizing agent 0.01 to 1% of a polyethylene glycol di, tri-ricinoleate in which the polyethylene glycol molecule, prior to esterification, has the formula $$HO(CH_2CH_2O)_nH$$

where $n$ is an integer from 2 to 10.

8. An improved normally solid, light and heat stable petroleum wax composition comprising a substantially colorless petroleum wax, 0.01% to 1% of 2,6 di-t-butyl-4-methylphenol as a heat stabilizing agent and 0.01% to 1% of polyethylene glycol di, tri-ricinoleate as a light stabilizing agent in which the polyethylene glycol molecule, prior to esterification, has the formula $$HO\ (CH_2CH_2O)_nH$$

where $n$ is an integer from 2 to 10.

DAVID W. YOUNG.
PAUL V. SMITH, Jr.

REFERENCES CITED

The following references are of record in the file of this patent:

UNITED STATES PATENTS

| Number | Name | Date |
|---|---|---|
| 2,210,140 | Colbeth | Aug. 6, 1940 |
| 2,301,806 | Hamilton et al. | Nov. 10, 1942 |

OTHER REFERENCES

"Derivatives from Hydrogenated Castor Oil," Bell & Taub; Journal of American Pharmaceutical Asso., April 1943, pages 115–118.

"Carbowax Compounds and Polyethylene Glycols," Carbide & Carbon Chem. Corp., New York, 1946, pages 3 and 10.

"Polyethylene Glycol Esters," Kessler Chem. Co. Inc., 1948, pages 1 and 5.